(12) United States Patent
Buckman et al.

(10) Patent No.: US 12,380,446 B2
(45) Date of Patent: *Aug. 5, 2025

(54) METHOD AND SYSTEM FOR AUTHORIZATION USING A PUBLIC LEDGER AND ENCRYPTION KEYS

(71) Applicant: Mastercard International Incorporated, Purchase, NY (US)

(72) Inventors: Brien Buckman, Stamford, CT (US); Benjamin Alexander Flast, New York, NY (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/432,690

(22) Filed: Feb. 5, 2024

(65) Prior Publication Data

US 2024/0177157 A1    May 30, 2024

Related U.S. Application Data

(60) Division of application No. 17/026,408, filed on Sep. 21, 2020, now Pat. No. 11,928,679, which is a
(Continued)

(51) Int. Cl.
*G06Q 20/40* (2012.01)
*H04L 9/32* (2006.01)
*H04L 9/40* (2022.01)

(52) U.S. Cl.
CPC .......... *G06Q 20/401* (2013.01); *H04L 9/321* (2013.01); *H04L 63/0428* (2013.01); *G06Q 2220/00* (2013.01); *H04L 2209/56* (2013.01)

(58) Field of Classification Search
CPC .. G06Q 20/401; G06Q 2220/00; H04L 9/321; H04L 63/0428; H04L 2209/56
(Continued)

(56) References Cited

U.S. PATENT DOCUMENTS

| | | |
|---|---|---|
| 9,870,562 B2 | 1/2018 | Davis et al. |
| 2003/0093698 A1 | 5/2003 | Challener et al. |

(Continued)

OTHER PUBLICATIONS

Ojetunde, et al., "An Endorsement-based Mobile Payment System for a Disaster Area", IEEE 29th International Conference on Advanced Information Networking and Applications, 2015, pp. 482-489.
(Continued)

*Primary Examiner* — Courtney P Jones
(74) *Attorney, Agent, or Firm* — Panitch Schwarze Belisario & Nadel LLP

(57) ABSTRACT

A method for conveying a data message using a public ledger includes: generating, by a generation module of a processing server, a data message, wherein the data message comprises one or more data values; electronically transmitting, by a transmitting device of the processing server, a data signal superimposed with the generated data message to a first computing system; receiving, by a receiving device of the processing server, a data signal superimposed with an encrypted message from the first computing system, wherein the encrypted message is generated via application of one or more encryption algorithms to the generated data message using at least one encryption key; appending, by the generation module of the processing server, an identification value to the encrypted message; and submitting, by the transmitting device of the processing server, the appended encrypted message to a public ledger associated with a second computing system.

12 Claims, 8 Drawing Sheets

Related U.S. Application Data continuation of application No. 15/169,846, filed on Jun. 1, 2016, now Pat. No. 10,810,588.

(58) Field of Classification Search
USPC .......................................................... 705/75
See application file for complete search history.

(56) References Cited

U.S. PATENT DOCUMENTS

| | | |
|---|---|---|
| 2003/0105977 A1 | 6/2003 | Brabson et al. |
| 2003/0123672 A1 | 7/2003 | Srinivasan et al. |
| 2003/0208395 A1 | 11/2003 | McClure et al. |
| 2004/0128498 A1 | 7/2004 | Lang et al. |
| 2015/0170112 A1 | 6/2015 | DeCastro |
| 2015/0356524 A1* | 12/2015 | Pennanen ............ G06Q 20/367 705/71 |
| 2016/0110711 A1 | 4/2016 | Collinge et al. |
| 2016/0162897 A1* | 6/2016 | Feeney ................ H04L 9/3236 705/71 |
| 2016/0253663 A1* | 9/2016 | Clark .................. G06Q 20/341 705/75 |
| 2017/0329980 A1* | 11/2017 | Hu ........................ H04L 63/062 |

OTHER PUBLICATIONS

Notification of Transmittal of the International Search Report and the Written Opinion of the International Searching Authority (PCT/ISA/220, PCT/ISA/210 and PCT/ISA/237) issued on Aug. 30, 2017, by the European Patent Office in corresponding International Application No. PCT/US2017/034108. (12 pages).

Swain, et al., "Blockchain: Blueprint for a New Economy", O'Reilly Media, Inc, Feb. 2015, pp. 1-149.

* cited by examiner

METHOD AND SYSTEM FOR AUTHORIZATION USING A PUBLIC LEDGER AND ENCRYPTION KEYS

FIELD

The present disclosure relates to conveyance and receipt of a data message using a public ledger, specifically the use of encryption keys and a third party system for encrypting a data message to be made publically available via a public ledger for receipt and decryption thereof by the recipient.

BACKGROUND

Data can often be conveyed using a plurality of different methods. In some cases, data can be conveyed privately, such as via the use of a private network or direct transmission from a delivering entity to a receiving entity using a private address on a public or semi-public network. However, in some instances it may be beneficial to share data by making it publically available, and yet still secured as to only be accessible by intended recipients. For example, authorization information for a payment transaction is typically transmitted via private network infrastructure associated with a payment network, which requires connection by the delivering entity to the payment network and the formatting of data suitable for conveyance via the private network infrastructure. In such an example, a small business may require significant resources and specialized computing systems to accommodate the use of a payment network. By sharing authorization information with intended recipients, such as an issuing financial institution associated with a consumer in a payment transaction, using a publically available network, the small business may participate in a transaction with less resource expenditure, and the receiving entity may be able to access the information in real-time via the publically available network.

However, in instances where the data being conveyed needs to be secure such that only the intended recipient can access the data, such as may be the case with sensitive financial information, the data must be encrypted or otherwise protected prior to being made publically available. In such instances, the delivering entity must be able to encrypt or otherwise protect the data, and must be able to share encryption keys and other associated data with the intended recipient(s), which may require private networks or other secure communication methods. As indicated above, such networks and methods may be unavailable or inefficient for use by some entities, particularly small businesses. Such an effect may be compounded if a delivering entity conveys data to a plurality of different entities, such as a small business that may transact with hundreds of different financial institutions, which would require the entity to share encryption keys with hundreds of different entities.

Thus, there is a need for a technical solution where an entity may convey data using a publically accessible network that is secured and only accessible via intended recipients, and where the data may be secured without requiring the conveying entity to encrypt the data or share encryption keys with the recipient. The use of a third party and a public ledger may result in a technologically improved system that enables an entity to convey data to an intended recipient by making it publically available, but not publically accessible, without requiring the conveying entity to participate in an encryption scheme directly with a recipient.

SUMMARY

The present disclosure provides a description of systems and methods for conveying and receiving data messages using a public ledger.

A method for conveying a data message using a public ledger includes: generating, by a generation module of a processing server, a data message, wherein the data message comprises one or more data values; electronically transmitting, by a transmitting device of the processing server, a data signal superimposed with the generated data message to a first computing system; receiving, by a receiving device of the processing server, a data signal superimposed with an encrypted message from the first computing system, wherein the encrypted message is generated via application of one or more encryption algorithms to the generated data message using at least one encryption key; appending, by the generation module of the processing server, an identification value to the encrypted message; and submitting, by the transmitting device of the processing server, the appended encrypted message to a public ledger associated with a second computing system.

A method for receiving a data message using a public ledger includes: receiving, by a receiving device of a processing server, a data signal superimposed with at least one encryption key from a first computing system; receiving, by the receiving device of the processing server, a data signal superimposed with a public ledger from a second computing system, wherein the public ledger is comprised of a plurality of encrypted messages and where each encrypted message is appended with one of a plurality of identification values; identifying, by a data identification module of the processing server, a specific encrypted message included in the public ledger appended with a specific identification value; and decrypting, by a decryption module of the processing server, the specific encrypted message to obtain a data message via application of one or more decryption algorithms using the at least one encryption key.

A system for conveying a data message using a public ledger includes: a generation module of a processing server configured to generate a data message, wherein the data message comprises one or more data values; a transmitting device of the processing server configured to electronically transmit a data signal superimposed with the generated data message to a first computing system; and a receiving device of the processing server configured to receive a data signal superimposed with an encrypted message from the first computing system, wherein the encrypted message is generated via application of one or more encryption algorithms to the generated data message using at least one encryption key. The generation module of the processing server is further configured to append an identification value to the encrypted message. The transmitting device of the processing server is further configured to submit the appended encrypted message to a public ledger associated with a second computing system.

A system for receiving a data message using a public ledger includes: a receiving device of a processing server configured to receive a data signal superimposed with at least one encryption key from a first computing system, and receive a data signal superimposed with a public ledger from a second computing system, wherein the public ledger is comprised of a plurality of encrypted messages and where each encrypted message is appended with one of a plurality of identification values; a data identification module of the processing server configured to identify a specific encrypted message included in the public ledger appended with a specific identification value; and a decryption module of the processing server configured to decrypt the specific encrypted message to obtain a data message via application of one or more decryption algorithms using the at least one encryption key.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Figure 1:
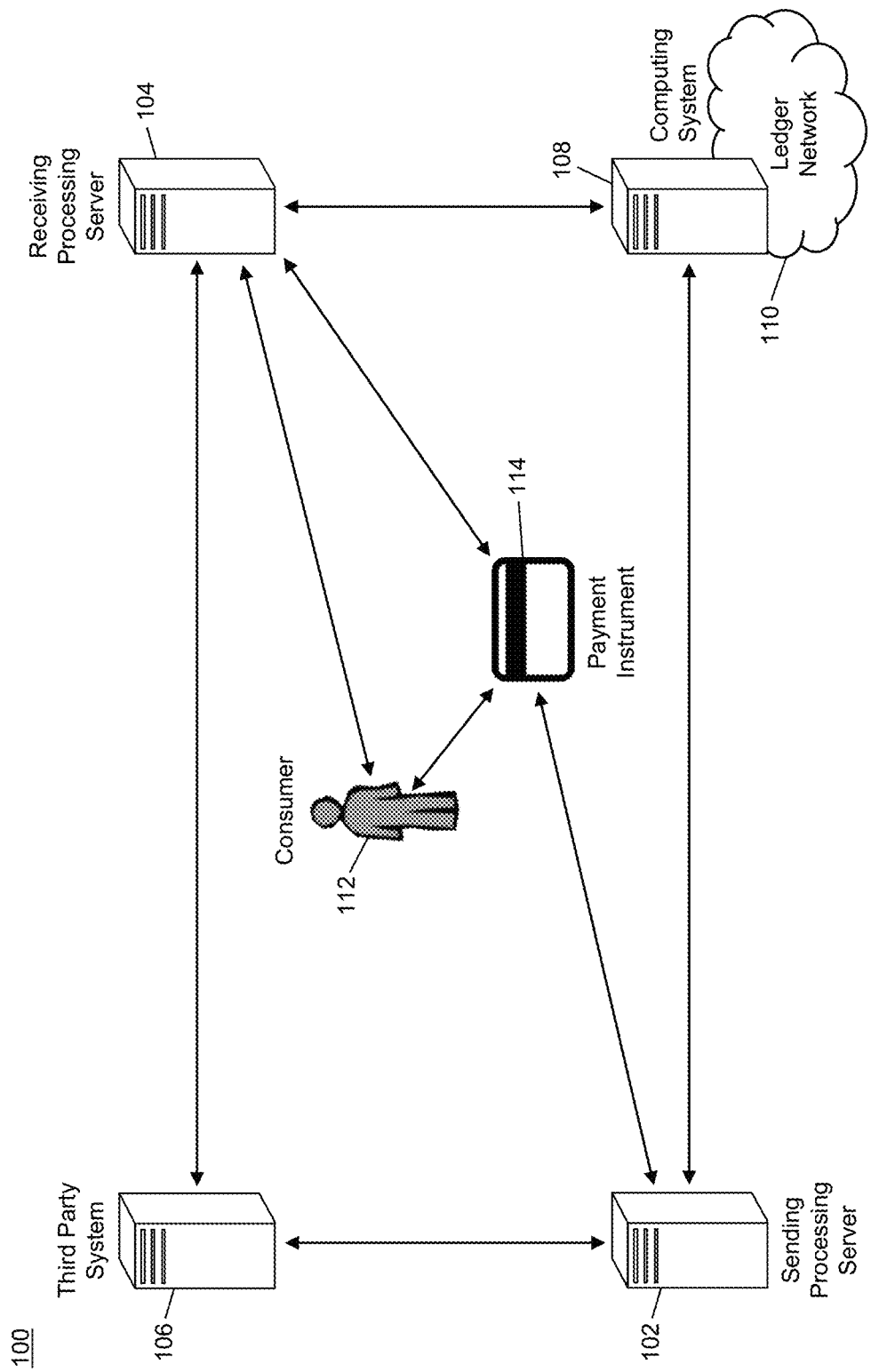
FIG. 1 is a block diagram illustrating a high level system architecture for secured conveyance of data messages using a public ledger in accordance with exemplary embodiments.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Glossary of Terms

Payment Network—A system or network used for the transfer of money via the use of cash-substitutes for thousands, millions, and even billions of transactions during a given period. Payment networks may use a variety of different protocols and procedures in order to process the transfer of money for various types of transactions. Transactions that may be performed via a payment network may include product or service purchases, credit purchases, debit transactions, fund transfers, account withdrawals, etc. Payment networks may be configured to perform transactions via cash-substitutes, which may include payment cards, letters of credit, checks, transaction accounts, etc. Examples of networks or systems configured to perform as payment networks include those operated by MasterCard®, VISA®, Discover®, American Express®, PayPal®, etc. Use of the term "payment network" herein may refer to both the payment network as an entity, and the physical payment network, such as the equipment, hardware, and software comprising the payment network.

Payment Rails—Infrastructure associated with a payment network used in the processing of payment transactions and the communication of transaction messages and other similar data between the payment network and other entities interconnected with the payment network that handles thousands, millions, and even billions of transactions during a given period. The payment rails may be comprised of the hardware used to establish the payment network and the interconnections between the payment network and other associated entities, such as financial institutions, gateway processors, etc. In some instances, payment rails may also be affected by software, such as via special programming of the communication hardware and devices that comprise the payment rails. For example, the payment rails may include specifically configured computing devices that are specially configured for the routing of transaction messages, which may be specially formatted data messages that are electronically transmitted via the payment rails, as discussed in more detail below.

Blockchain—A public ledger of all transactions of a blockchain-based currency. One or more computing devices may comprise a blockchain network, which may be configured to process and record transactions as part of a block in the blockchain. Once a block is completed, the block is added to the blockchain and the transaction record thereby updated. In many instances, the blockchain may be a ledger of transactions in chronological order, or may be presented in any other order that may be suitable for use by the blockchain network. In some configurations, transactions recorded in the blockchain may include a destination address and a currency amount, such that the blockchain records how much currency is attributable to a specific address. In some instances, the transactions are financial and others not financial, or might include additional or different information, such as a source address, timestamp, etc. In some embodiments, a blockchain may also or alternatively include nearly any type of data as a form of transaction that is or needs to be placed in a permission-less distributed database that maintains a continuously growing list of data records hardened against tampering and revision, even by its operators, and may be confirmed and validated by the blockchain network through proof of work and/or any other suitable verification techniques associated therewith. In some cases, data regarding a given transaction may further include additional data that is not directly part of the transaction appended to transaction data. In some instances, the inclusion of such data in a blockchain may constitute a transaction. In such instances, a blockchain may not be directly associated with a specific digital, virtual, fiat, or other type of currency.

System for Secured Conveyance of Data Using a Public Ledger

FIG. 1 illustrates a system 100 for the secured conveyance of data from one entity to another made publically available, but not publically accessible, using a public ledger.

The system 100 may include a sending processing server 102. The sending processing server 102, discussed in more detail below, may be configured to generate a data message that is comprised of at least one or more data values. For instance, in one example, the sending processing server 102 may be associated with a merchant involved in a payment transaction, and the data message generated by the sending processing server 102 may comprise authorization information for the payment transaction for authorization by a financial institution involved therewith, such as may be associated with a customer involved in the payment transaction. The data message generated by the sending processing server 102 may be intended for receipt by a receiving processing server 104. The receiving processing server 104, discussed in more detail below, may be configured to receive an encrypted data message and decrypt it to obtain the data message generated by the sending processing server 102, using the methods and systems discussed herein. In the above example, the receiving processing server 104 may be, for instance, associated with the financial institution that is to authorize the payment transaction.

The sending processing server 102 may be configured to electronically transmit a data signal that is superimposed or otherwise encoded with the generated data message to a third party system 106. The data signal may also be superimposed or otherwise encoded with identifying information associate with the receiving processing server 104, such as a network address, a system identifier, a bank identification number (e.g., as in the above example where the receiving processing server 104 may be associated with a financial institution), etc. The third party system 106 may be a system associated with a third party entity that is configured to encrypt data using one or more different encryption schemes and a plurality of different encryption keys. The data signal may be electronically transmitted to the third party system 106 using a suitable communication network and method, such as via a local area network, a wireless area network, a radio frequency network, the Internet, etc. In some instances, the data signal and/or data message may be encrypted by the sending processing server 102, as discussed in more detail below.

The third party system 106 may, upon receipt of the data signal, parse the data message and identifying information. The third party system 106 may then encrypt the data message. The data message may be encrypted using one or more suitable data encryption algorithms as applied to an encryption key. The encryption key may be generated or otherwise identified by the third party system 106 using a suitable method for the generation or identification of an encryption key as will be apparent to persons having skill in the relevant art. In some instances, the encryption key may be previously associated with the receiving processing server 104 and identified via the identifying information parsed from the data signal received from the sending processing server 102.

Upon encrypting the data message, the third party system 106 may electronically transmit a return data signal superimposed or otherwise encoded with the encrypted data message to the sending processing server 102. In some instances, the return data signal may be electronically transmitted using the same communication network and method used by the sending processing server 102 in transmitting the original data signal. In other instances, an alternative communication network and method may be used. In some cases, the return data signal may be encrypted by the third party system 106, as discussed in more detail below. The third party system 106 may also electronically transmit a data signal to the receiving processing server 104 that is superimposed or otherwise encoded with the encryption key used to encrypt the data message. As used herein "encryption key" may refer to both a key used to encrypt data as well as a corresponding decryption key used to decrypt the encrypted data, such as a corresponding key in a key pair. In some instances, the third party system 106 may use the same communication network and method to communicate with the receiving processing server 104 as used to communicate with the sending processing server 102. In other instances, an alternative communication network may be used. As discussed in more detail below, in some instances the data signal or encryption key superimposed thereon electronically transmitted to the receiving processing server 104 may be encrypted or otherwise protected.

The sending processing server 102 may receive the encrypted data message from the third party system 106 and may append an identification value to the encrypted data message. The identification value may be a value associated with the receiving processing server 104 that is known to the receiving processing server 104, which may be used for identification of the identification value. In some instances, a single identification value may be appended to each encrypted data message for which the receiving processing server 104 is an intended recipient. In other instances, more than one identification value may be used, which may be previously known to the receiving processing server 104 or may be distributed to the receiving processing server 104 from the sending processing server 102 using a suitable method. Once the identification value is appended to the encrypted data message, the sending processing server 102 may electronically transmit a data signal to a computing system 108 that is superimposed or otherwise encoded with the encrypted data message and appended identification value. The data signal may be electronically transmitted to the computing system 108 using a suitable communication network and method, which may be the same as the communication network and method used to communicate with the third party system 106, or may be an alternative communication network and method. For example, as discussed below, the sending processing server 102 may communicate with the third party system 106 using payment rails and may communicate with the computing system 108 using the Internet.

The computing system 108 may be associated with a ledger network 110. The ledger network 110 may be a network of one or more computing systems 108 that is configured to distribute a public ledger to a plurality of different computing devices via the associated computing systems 108. The public ledger may be a database or other data storage schema used to store data that is publically available to any entity that may communicate with the ledger network 110 or an associated computing system 108. The computing system 108 may be configured to add the encrypted data message and appended identification value to the associated public ledger. In some instances, the public ledger may be a blockchain and the ledger network 110 may be a blockchain network where the associated computing systems 108 may be nodes of the blockchain network configured to add blocks of transactions to the blockchain. In such an instance, the encrypted data message and appended identification value may be posted to the blockchain as a transaction in a block, such as where the appended identification value may be a destination address associated with the receiving processing server 104.

The receiving processing server 104 may access the public ledger via the computing system 108 or ledger network 110. The receiving processing server 104 may identify the encrypted data message as being appended with the identification value associated with or otherwise known to the receiving processing server 104. The receiving processing server 104 may then decrypt the encrypted data message using the encryption key received from the third party system 106. The receiving processing server 104 may then have access to the data message generated by the sending processing server 102.

In one embodiment, the sending processing server 102 may be associated with a merchant involved in a payment transaction with a consumer 112 for the sale of goods or services to the consumer 112. The receiving processing server 104 may be associated with an issuing financial institution or other entity that may be configured to issue a payment instrument 114, such as a credit card or other payment card, to the consumer 112 for use in funding the payment transaction. The consumer 112 may present the payment instrument 114 to the merchant as part of the payment transaction. Payment details associated therewith may be read by, entered into, or otherwise obtained by the sending processing server 102, which may be included in the data values comprising the generated data message. The generated data message may include the payment details and any other data suitable for use in authorization of the payment transaction. The data message may be conveyed to the receiving processing server 104 using the methods discussed herein, and the receiving processing server 104 may authorize or deny the payment transaction accordingly. In some instances, an authorization response may be returned to the sending processing server 102 using the methods discussed herein, where the receiving processing server 104 may operate as the sending processing server 102 to convey a data message back to the sending processing server 102. In other instances, the authorization response may be directly transmitted to the sending processing server 102, such as in instances where the authorization response may not include any sensitive data. In some such instances, the authorization response may be posted to the public ledger without encryption. Additional detail regarding the authorization of payment transactions and data associated therewith is discussed in more detail below with respect to the process 700 illustrated in FIG. 7. The sending processing server 102 may thus be able to participate in payment transactions involving thousands of different financial institutions, without requiring the use of any specialized communications, encryption methods and keys, etc. for the various financial institutions.

In some further embodiments, the third party system 106 may be a payment network. In such an embodiment, the sending processing server 102 and receiving processing server 104 may communicate with the third party system 106 using the payment rails associated with the payment network. In such an instance, communications between the sending processing server 102 and receiving processing server 104 and the third party system 106 may be secured via use of the associated specialized infrastructure. In some cases, data signals electronically transmitted to the third party system 106 may comprise transaction messages, which may be specially formatted data messages, as discussed in more detail below with respect to the process 700 illustrated in FIG. 7. In such embodiments, the sending processing server 102 may thus be able to convey data messages using a public ledger to any of thousands or millions of financial institutions associated with a payment network.

In some embodiments, communications between the third party system 106 and the sending processing server 102 and/or receiving processing server 104 may be encrypted. In such embodiments, the third party system 106 and respective server may use one or more agreed upon encryption schemes and encryption keys for use in encrypting communications. Data signals and/or data superimposed thereon may be encrypted prior to transmission, which may then be decrypted by the recipient using the agreed upon encryption scheme and key. In such an embodiment, the data message being conveyed may be securely encrypted at each step of the process, with the sending processing server 102 may be able to convey data messages to a plurality of different receiving processing servers 104, such as to thousands of different financial institutions in the above example, with the sending processing server 102 only having to manage encryption scheme(s) and/or key(s) with a single entity, the third party system 106.

The methods and systems discussed herein thus enable the sending processing server 102 to convey a data message to the receiving processing server 104 via a public ledger, without the need for the sending processing server 102 to encrypt the data message or share encryption keys with the receiving processing server 104. In instances where a sending processing server 102 may need to convey data messages to thousands, if not millions, of different receiving processing servers 104, such as in a payment transaction context, the sending processing server 102 may do so securely, with the data being made publically available, but not publically accessible, using the public ledger. The sending processing server 102 may thus accomplish the secured conveyance of data to thousands or millions of entities, with connections to only the third party system 106 and computing system 108. As such, the methods and systems discussed herein provide for a technological improvement to data conveyance methods between a sending processing server 102 and receiving processing server 104 that use a public ledger where any intended recipient may access data in real-time that is publically available, but secured from all but the intended recipients.

Sending Processing Server

Figure 2:
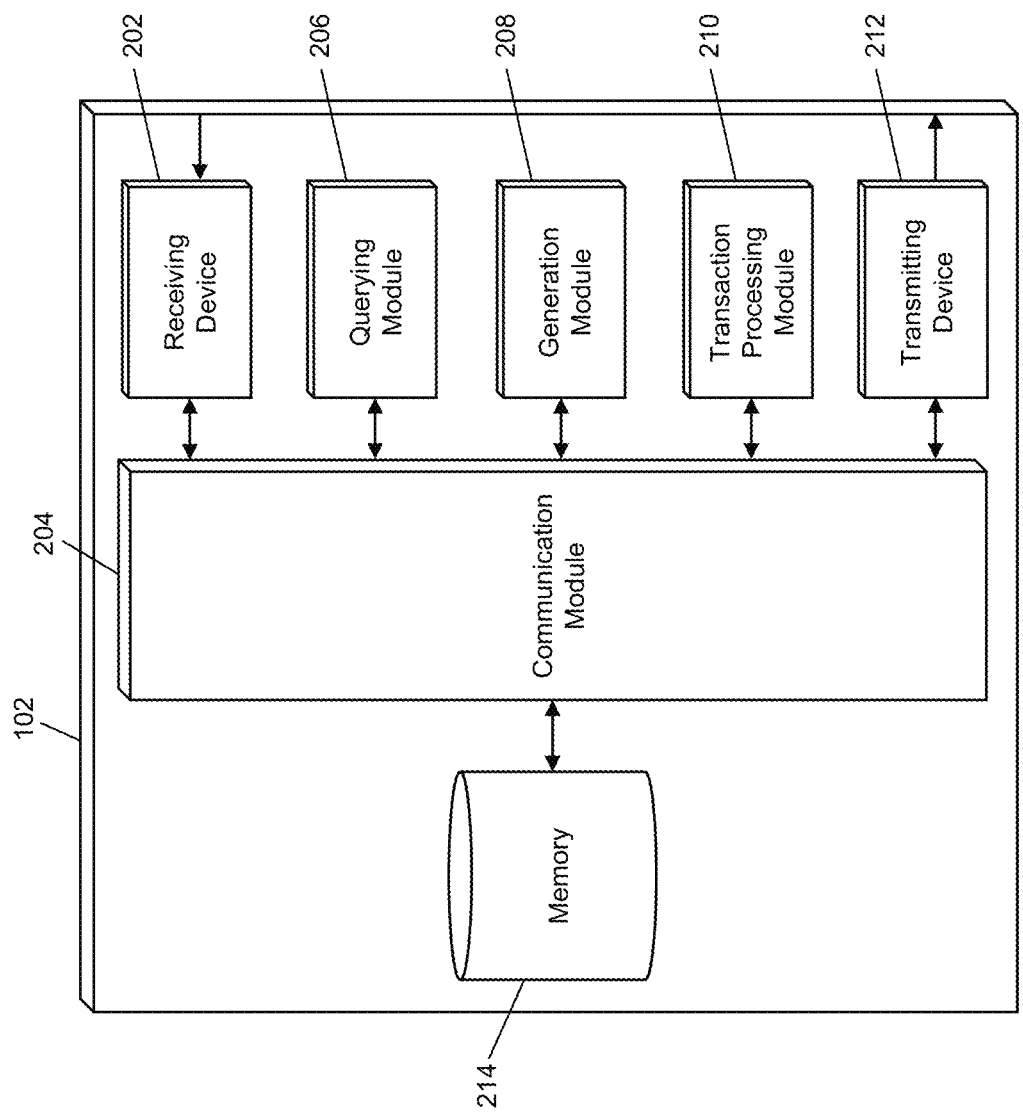
FIG. 2 is a block diagram illustrating the sending processing server of FIG. 1 for the secured conveyance of data using a public ledger in accordance with exemplary embodiments.

FIG. 2 illustrates an embodiment of the sending processing server 102 of the system 100. It will be apparent to persons having skill in the relevant art that the embodiment of the sending processing server 102 illustrated in FIG. 2 is provided as illustration only and may not be exhaustive to all possible configurations of the sending processing server 102 suitable for performing the functions as discussed herein. For example, the computer system 800 illustrated in FIG. 8 and discussed in more detail below may be a suitable configuration of the sending processing server 102.

The sending processing server 102 may include a receiving device 202. The receiving device 202 may be configured to receive data over one or more networks via one or more network protocols. In some embodiments, the receiving device 202 may be configured to receive data over the payment rails, such as using specially configured infrastructure associated with payment networks for the transmission of transaction messages that include sensitive financial data and information. In some instances, the receiving device 202 may also be configured to receive data from receiving processing servers 104, third party systems 106, computing systems 108, and other entities via alternative networks, such as the Internet. In some embodiments, the receiving device 202 may be comprised of multiple devices, such as different receiving devices for receiving data over different networks, such as a first receiving device for receiving data over payment rails and a second receiving device for receiving data over the Internet. The receiving device 202 may receive electronically data signals that are transmitted, where data may be superimposed on the data signal and decoded, parsed, read, or otherwise obtained via receipt of the data signal by the receiving device 202. In some instances, the receiving device 202 may include a parsing module for parsing the received data signal to obtain the data superimposed thereon. For example, the receiving device 202 may include a parser program configured to receive and transform the received data signal into usable input for the functions performed by the processing device to carry out the methods and systems described herein.

The receiving device 202 may be configured to receive data signals electronically transmitted by third party systems 106 that may be superimposed or otherwise encoded with encrypted data messages. In some instances, the data signal may be encrypted or the encrypted data message may be further encrypted by the third party system 106 prior to transmission. In some embodiments, the receiving device 202 may be configured to receive data signals electronically transmitted by receiving processing servers 104, such as may be superimposed or otherwise encoded with data related to a payment transaction involving the sending processing server 102, such as an authorization response.

The sending processing server 102 may also include a communication module 204. The communication module 204 may be configured to transmit data between modules, engines, databases, memories, and other components of the sending processing server 102 for use in performing the functions discussed herein. The communication module 204 may be comprised of one or more communication types and utilize various communication methods for communications within a computing device. For example, the communication module 204 may be comprised of a bus, contact pin connectors, wires, etc. In some embodiments, the communication module 204 may also be configured to communicate between internal components of the sending processing server 102 and external components of the sending processing server 102, such as externally connected databases, display devices, input devices, etc. The sending processing server 102 may also include a processing device. The processing device may be configured to perform the functions of the sending processing server 102 discussed herein as will be apparent to persons having skill in the relevant art. In some embodiments, the processing device may include and/or be comprised of a plurality of engines and/or modules specially configured to perform one or more functions of the processing device, such as a querying module 206, a generation module 208, a transaction processing module 210, etc. As used herein, the term "module" may be software or hardware particularly programmed to receive an input, perform one or more processes using the input, and provide an output. The input, output, and processes performed by various modules will be apparent to one skilled in the art based upon the present disclosure.

The sending processing server 102 may also include a memory 214. The memory 214 may be configured to store data for use by the sending processing server 102 in performing the functions discussed herein. The memory 214 may be configured to store data using suitable data formatting methods and schema and may be any suitable type of memory, such as read-only memory, random access memory, etc. The memory 214 may include, for example, encryption keys and algorithms, communication protocols and standards, data formatting standards and protocols, program code for modules and application programs of the processing device, and other data that may be suitable for use by the sending processing server 102 in the performance of the functions disclosed herein as will be apparent to persons having skill in the relevant art. In some embodiments, the memory 214 may be comprised of or may otherwise include a relational database that utilizes structured query language for the storage, identification, modifying, updating, accessing, etc. of structured data sets stored therein.

The sending processing server 102 may include a querying module 206. The querying module 206 may be configured to execute queries on databases to identify information. The querying module 206 may receive one or more data values or query strings, and may execute a query string based thereon on an indicated database, such as the memory 214, to identify information stored therein. The querying module 206 may then output the identified information to an appropriate engine or module of the sending processing server 102 as necessary. The querying module 206 may, for example, execute a query on the memory 214 to identify data stored therein for a payment transaction for which authorization is to be requested. In another example, the querying module 206 may execute a query on the memory 214 to identify an encryption key used to decrypt an encrypted data signal electronically transmitted by the third party system 106 and received by the receiving device 202.

The sending processing server 102 may also include a generation module 208. The generation module 208 may be configured to generate data messages for conveyance to receiving processing servers 104 via public ledgers. The generation module 208 may receive one or more data values as input, may generate a data message comprise of the one or more data values, and output the generated data message to another module or engine of the sending processing server 102 for use thereof. In some instances, the generation module 208 or another suitable module or engine of the sending processing server 102 may be configured to encrypt generated data messages, such as via application of an agreed upon encryption key to an agreed upon encryption algorithm, prior to transmission to a third party system 106.

The sending processing server 102 may also include a transaction processing module 210. The transaction processing module 210 may be configured to perform functions related to the processing of payment transactions. For example, the transaction processing module 210 may be configured to calculate transaction amounts, identify product data, read or decode payment details, calculate payment cryptograms, generate and/or format authorization requests, etc. Additional functions that may be performed by the transaction processing module 210 will be apparent to persons having skill in the relevant art.

The sending processing server 102 may also include a transmitting device 212. The transmitting device 212 may be configured to transmit data over one or more networks via one or more network protocols. In some embodiments, the transmitting device 212 may be configured to transmit data over the payment rails, such as using specially configured infrastructure associated with payment networks for the transmission of transaction messages that include sensitive financial data and information, such as identified payment credentials. In some instances, the transmitting device 212 may be configured to transmit data to third party systems 106, receiving processing servers 104, computing systems 108, and other entities via alternative networks, such as the Internet. In some embodiments, the transmitting device 212 may be comprised of multiple devices, such as different transmitting devices for transmitting data over different networks, such as a first transmitting device for transmitting data over the payment rails and a second transmitting device for transmitting data over the Internet. The transmitting device 212 may electronically transmit data signals that have data superimposed that may be parsed by a receiving computing device. In some instances, the transmitting device 212 may include one or more modules for superimposing, encoding, or otherwise formatting data into data signals suitable for transmission.

The transmitting device 212 may be configured to electronically transmit data signals to third party systems 106 that are superimposed or otherwise encoded with data messages generated by the generation module 208 for encryption. In some instances, the data signals or data messages superimposed thereon may be encrypted prior to transmission for decryption by the third party system 106. The transmitting device 212 may also be configured to electronically transmit data signals superimposed or otherwise encoded with encrypted data messages (e.g., as received from the third party system 106 by the receiving device 202) to computing systems 108. In some embodiments, the transmitting device 212 may also be configured to electronically transmit data signals to the receiving processing server 104, such as may be superimposed or otherwise encoded with identification values for use in identifying encrypted data messages posted to a public ledger.

Receiving Processing Server

Figure 3:
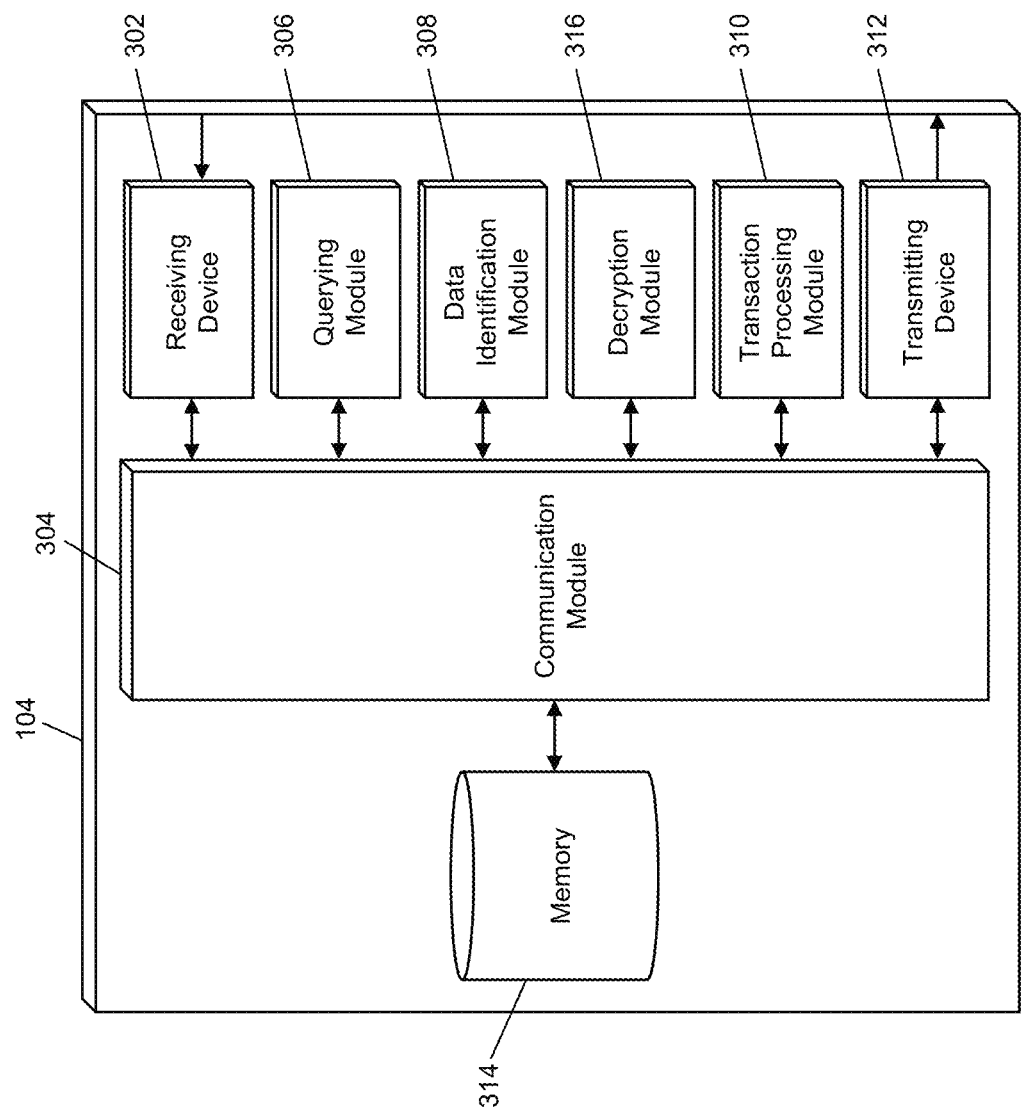
FIG. 3 is a block diagram illustrating the receiving processing server of FIG. 1 for the receipt of data conveyed using a public ledger in accordance with exemplary embodiments.

FIG. 3 illustrates an embodiment of the receiving processing server 104 of the system 100. It will be apparent to persons having skill in the relevant art that the embodiment of the receiving processing server 104 illustrated in FIG. 3 is provided as illustration only and may not be exhaustive to all possible configurations of the receiving processing server 104 suitable for performing the functions as discussed herein. For example, the computer system 800 illustrated in FIG. 8 and discussed in more detail below may be a suitable configuration of the receiving processing server 104.

The receiving processing server 104 may include a receiving device 302. The receiving device 302 may be configured to receive data over one or more networks via one or more network protocols. In some embodiments, the receiving device 302 may be configured to receive data over the payment rails, such as using specially configured infrastructure associated with payment networks for the transmission of transaction messages that include sensitive financial data and information. In some instances, the receiving device 302 may also be configured to receive data from sending processing servers 102, third party systems 106, computing systems 108, and other entities via alternative networks, such as the Internet. In some embodiments, the receiving device 302 may be comprised of multiple devices, such as different receiving devices for receiving data over different networks, such as a first receiving device for receiving data over payment rails and a second receiving device for receiving data over the Internet. The receiving device 302 may receive electronically data signals that are transmitted, where data may be superimposed on the data signal and decoded, parsed, read, or otherwise obtained via receipt of the data signal by the receiving device 302. In some instances, the receiving device 302 may include a parsing module for parsing the received data signal to obtain the data superimposed thereon. For example, the receiving device 302 may include a parser program configured to receive and transform the received data signal into usable input for the functions performed by the processing device to carry out the methods and systems described herein.

The receiving device 302 may be configured to receive data signals electronically transmitted by third party systems 106 that may be superimposed or otherwise encoded with encryption keys. In some instances, the data signal or encryption keys may be encrypted by the third party system 106 prior to transmission. In some embodiments, the receiving device 302 may be configured to receive data signals electronically transmitted by sending processing servers 102, such as may be superimposed or otherwise encoded with identification values for use in identifying encrypted data messages posted to public ledgers. The receiving device 302 may also be configured to receive data signals electronically transmitted by computing systems 108 that are superimposed or otherwise encoded with public ledger data, which may include a plurality of encrypted data messages and appended identification values.

The receiving processing server 104 may also include a communication module 304. The communication module 304 may be configured to transmit data between modules, engines, databases, memories, and other components of the receiving processing server 104 for use in performing the functions discussed herein. The communication module 304 may be comprised of one or more communication types and utilize various communication methods for communications within a computing device. For example, the communication module 304 may be comprised of a bus, contact pin connectors, wires, etc. In some embodiments, the communication module 304 may also be configured to communicate between internal components of the receiving processing server 104 and external components of the receiving processing server 104, such as externally connected databases, display devices, input devices, etc. The receiving processing server 104 may also include a processing device. The processing device may be configured to perform the functions of the receiving processing server 104 discussed herein as will be apparent to persons having skill in the relevant art. In some embodiments, the processing device may include and/or be comprised of a plurality of engines and/or modules specially configured to perform one or more functions of the processing device, such as a querying module 306, a data identification module 308, a transaction processing module 310, a decryption module 316, etc. As used herein, the term "module" may be software or hardware particularly programmed to receive an input, perform one or more processes using the input, and provide an output. The input, output, and processes performed by various modules will be apparent to one skilled in the art based upon the present disclosure.

The receiving processing server 104 may also include a memory 314. The memory 314 may be configured to store data for use by the receiving processing server 104 in performing the functions discussed herein. The memory 314 may be configured to store data using suitable data formatting methods and schema and may be any suitable type of memory, such as read-only memory, random access memory, etc. The memory 314 may include, for example, encryption keys and algorithms, communication protocols and standards, data formatting standards and protocols, program code for modules and application programs of the processing device, and other data that may be suitable for use by the receiving processing server 104 in the performance of the functions disclosed herein as will be apparent to persons having skill in the relevant art. In some embodiments, the memory 314 may be comprised of or may otherwise include a relational database that utilizes structured query language for the storage, identification, modifying, updating, accessing, etc. of structured data sets stored therein.

The receiving processing server 104 may include a querying module 306. The querying module 306 may be configured to execute queries on databases to identify information. The querying module 306 may receive one or more data values or query strings, and may execute a query string based thereon on an indicated database, such as the memory 314, to identify information stored therein. The querying module 306 may then output the identified information to an appropriate engine or module of the receiving processing server 104 as necessary. The querying module 306 may, for example, execute a query on the memory 314 to identify data stored therein for a transaction account associated with a payment transaction for which authorization is requested. In another example, the querying module 306 may execute a query on the memory 314 to identify an encryption key used to decrypt an encrypted data signal electronically transmitted by the third party system 106 and received by the receiving device 302.

The receiving processing server 104 may also include a data identification module 308. The data identification module 308 may be configured to identify data based on one or more data inputs received thereby. The data identification module 308 may receive one or more data inputs, may identify data included therein or indicated thereby, and may output the identified data to another module or engine of the receiving processing server 104. For example, the data identification module 308 may be configured to identify an encrypted data message included in a public ledger (e.g., received by the receiving device 302 from the computing system 108) that is appended with a specific identification value, such as may be queried from the memory 314 by the querying module 306 and/or received by the receiving device 302 from the sending processing server 102.

The receiving processing server 104 may also include a decryption module 316. The decryption module 316 may be configured to decrypt data via the application of one or more encryption keys to encrypted data using one or more encryption algorithms. The decryption module 316 may receive an encrypted data message as input, may decrypt the encrypted data message, and may output the unencrypted data message to another module or engine of the receiving processing server 104. In some instances, the decryption module 316 may receive the encryption key and/or algorithm as input. In other instances, the decryption module 316 may identify, or may instruct the querying module 306 to execute a query to identify, the encryption key and/or algorithm used to decrypt an encrypted data message.

The receiving processing server 104 may also include a transaction processing module 310. The transaction processing module 310 may be configured to perform functions related to the processing of payment transactions. For example, the transaction processing module 310 may be configured to determine if a payment transaction for which authorization is requested is to be approved or denied, such as based on transaction account data (e.g., identified from the memory 314) and transaction data included in a data message decrypted by the decryption module 316. The transaction processing module 310 may also be configured to generate an authorization response based on the determination. Additional functions that may be performed by the transaction processing module 210 will be apparent to persons having skill in the relevant art.

The receiving processing server 104 may also include a transmitting device 312. The transmitting device 312 may be configured to transmit data over one or more networks via one or more network protocols. In some embodiments, the transmitting device 312 may be configured to transmit data over the payment rails, such as using specially configured infrastructure associated with payment networks for the transmission of transaction messages that include sensitive financial data and information, such as identified payment credentials. In some instances, the transmitting device 312 may be configured to transmit data to third party systems 106, sending processing servers 102, computing systems 108, and other entities via alternative networks, such as the Internet. In some embodiments, the transmitting device 312 may be comprised of multiple devices, such as different transmitting devices for transmitting data over different networks, such as a first transmitting device for transmitting data over the payment rails and a second transmitting device for transmitting data over the Internet. The transmitting device 312 may electronically transmit data signals that have data superimposed that may be parsed by a receiving computing device. In some instances, the transmitting device 312 may include one or more modules for superimposing, encoding, or otherwise formatting data into data signals suitable for transmission.

The transmitting device 312 may be configured to electronically transmit data signals to computing systems 108 that are superimposed or otherwise encoded with data requests for the public ledger. In some instances, a data request may include a specific identification value for the identification of an encrypted data message associated therewith posted to the public ledger. In some embodiments, the transmitting device 312 may also be configured to electronically transmit data signals to the sending processing server 102 that may be superimposed or otherwise encoded with an authorization response for a payment transaction, such as may indicate if a related payment transaction is approved or denied.

Secured Conveyance of Data via a Public Ledger

Figure 4:
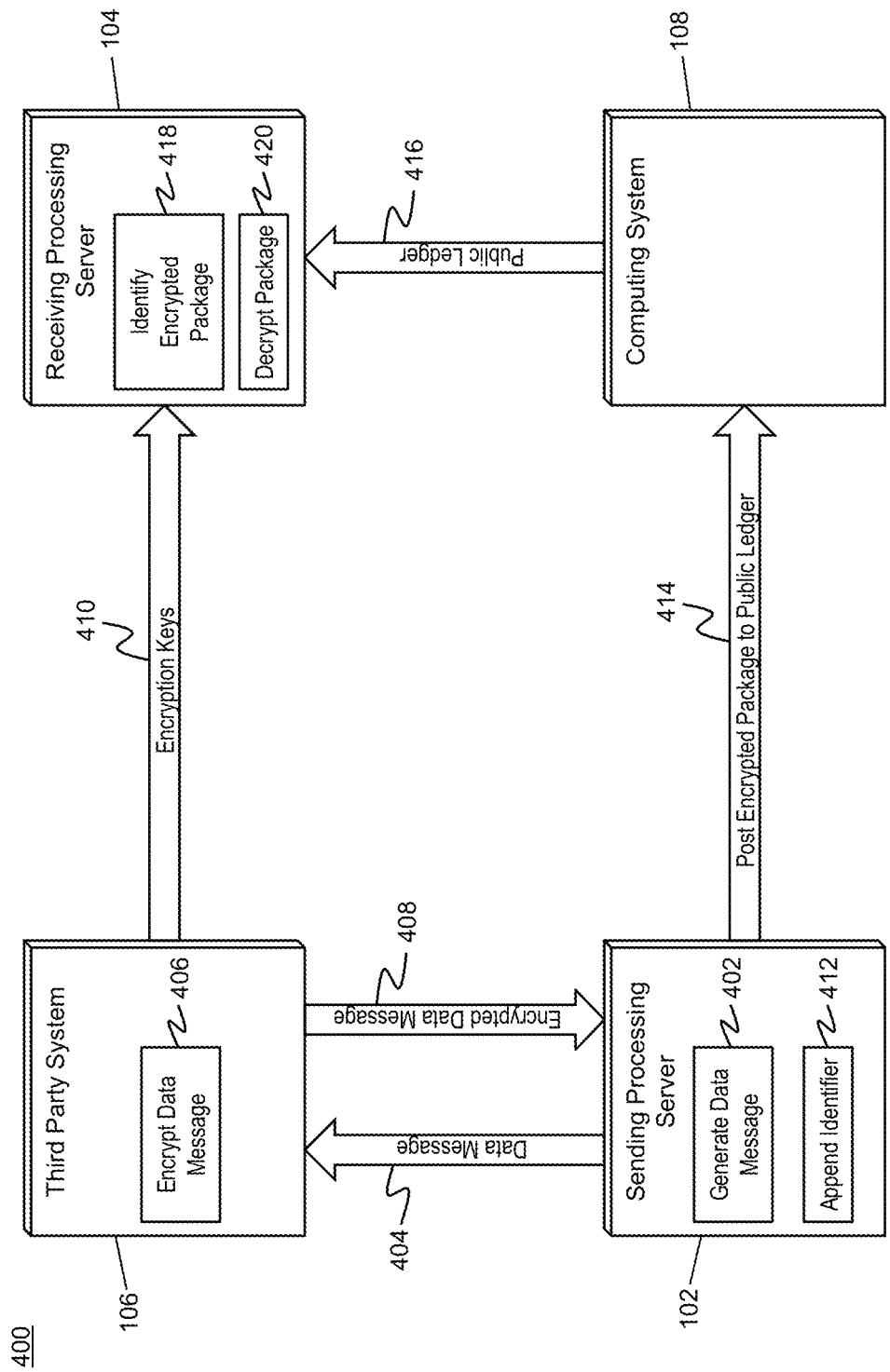
FIG. 4 is a flow diagram illustrating a process for securely conveying data via a public ledger using the system of FIG. 1 in accordance with exemplary embodiments.

FIG. 4 illustrates a process 400 for the secured conveyance of data via a public ledger, where the data is made publically available via the public ledger, but is only accessible via an intended recipient due to encryption.

In step 402, the generation module 208 of the sending processing server 102 may generate a data message to be conveyed to the receiving processing server 104. The data message may be comprised of one or more data values. For example, the data message may be comprise of data for authorization of a payment transaction, such as a transaction amount, payment details, etc. In step 404, the transmitting device 212 of the sending processing server 102 may electronically transmit a data signal to the third party system 106 that is superimposed or otherwise encoded with the generated data message, which may be transmitted using a suitable communication network or method. In one embodiment, the data signal may also be superimposed or otherwise encoded with identifying information associated with the receiving processing server 104. In some instances, the sending processing server 102 may encrypt the data message or data signal prior to transmission, which may then be encrypted by the third party system 106 using an agreed upon encryption/decryption scheme and associated keys.

In step 406, the third party system 106 may encrypt the data message via application of one or more encryption algorithms to the data message using at least one encryption key. The at least one encryption key may be generated or otherwise identified by the third party system 106. In some instances, the at least one encryption key may be previously associated with the receiving processing server 104, as may be identified via the identifying information parsed from the data signal. In step 408, the third party system 106 may electronically transmit a data signal back to the sending processing server 102 that is superimposed or otherwise encoded with the encrypted data message. In step 410, the third party system 106 may electronically transmit a data signal to the receiving processing server 104, as identified via the identifying information parsed from the received data signal, that is superimposed or otherwise encoded with the at least one encryption key used to encrypt the data message. In some instances, the third party system 106 may encrypt the encryption key(s) or data signal prior to transmission, which may then be decrypted by the receiving processing server using an agreed upon encryption/decryption scheme and associated keys.

In step 412, the generation module 208 or other suitable module or engine of the sending processing server 102 may append an identification value to the encrypted data message. In some instances, the identification value may be previously associated with the receiving processing server 104. In other instances, the sending processing server 102 may generate or otherwise identify the identification value. In some such instances, identification of the identification value may include the transmitting device 212 of the sending processing server 102 electronically transmitting a data signal to the receiving processing server 102 that is superimposed or otherwise encoded with the identification value. In step 414, the transmitting device 212 of the sending processing server 102 may electronically transmit a data signal superimposed or otherwise encoded with a package comprising the encrypted data message and appended identification value to the computing system 108 associated with the ledger network 110 for posting to the associated public ledger.

In step 416, the receiving device 302 of the receiving processing server 104 may receive a data signal from the computing system 108 associated with the ledger network 110 that is superimposed with the public ledger. In step 418, the data identification module 308 of the receiving processing server 104 may identify an encrypted package in the public ledger that includes the identification value associated with the receiving processing server 104 or otherwise provided by the sending processing server 102 that was appended to the encrypted data message by the sending processing server 102 in step 412. In step 420, the decryption module 316 of the receiving processing server 104 may decrypt the encrypted data message via application of one or more encryption algorithms thereto using the encryption keys received from the third party system 106 by the receiving device 302 of the receiving processing server 104.

Exemplary Method for Conveying a Data Message Using a Public Ledger

Figure 5:
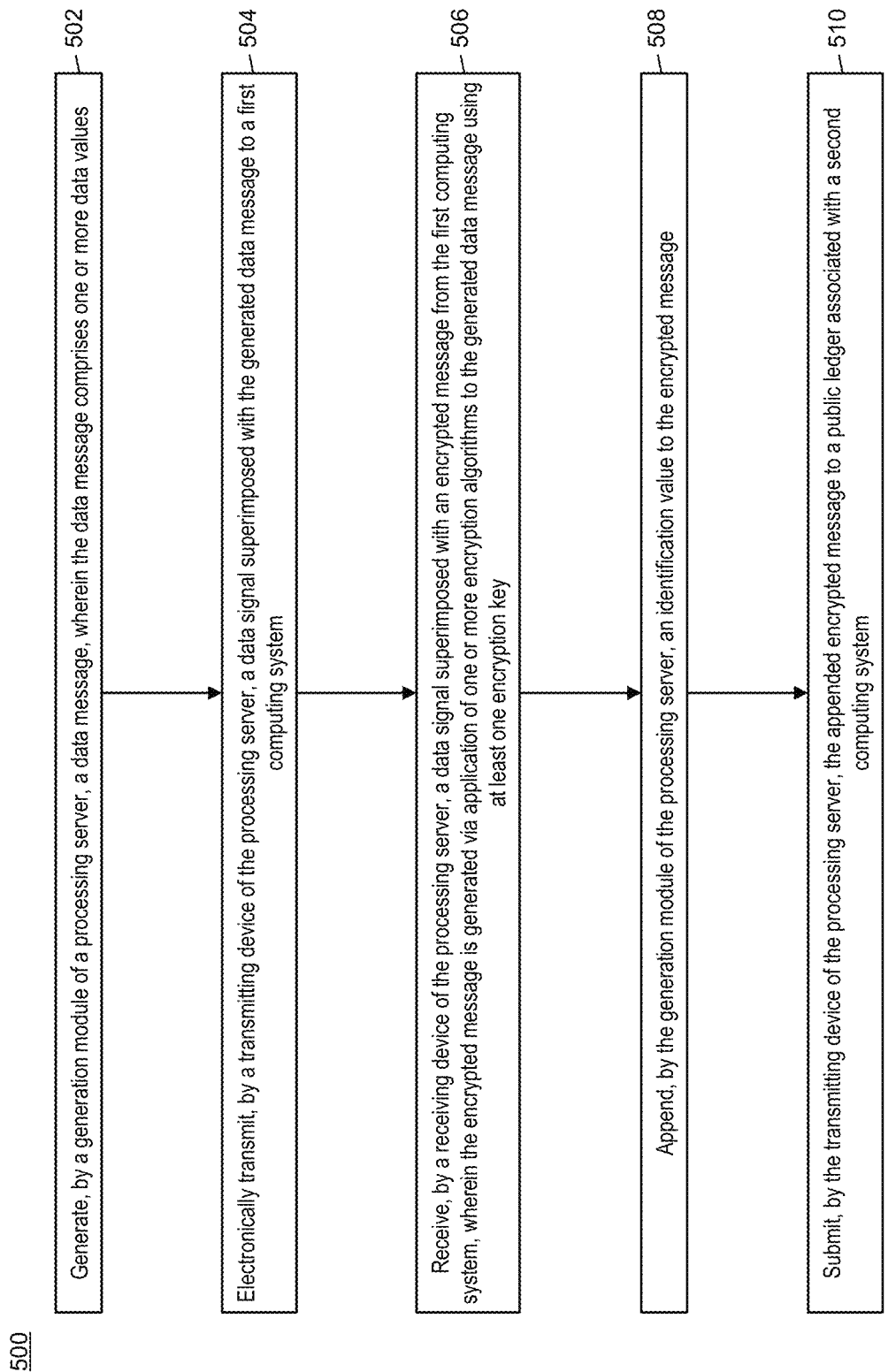
FIG. 5 is a flow chart illustrating an exemplary method for conveying a data message using a public ledger in accordance with exemplary embodiments.

FIG. 5 illustrates a method 500 for the secured conveyance of a data message to an entity using a public ledger and a third party system.

In step 502, a data message may be generated by a generation module (e.g., the generation module 208) of a processing server (e.g., the sending processing server 102), wherein the data message comprises one or more data values. In step 504, a data signal superimposed with the generated data message may be electronically transmitted by a transmitting device (e.g., the transmitting device 212) of the processing server to a first computing system (e.g., the third party system 106).

In step 506, a data signal superimposed with an encrypted message may be received by a receiving device (e.g., the receiving device 202) of the processing server from the first computing system, wherein the encrypted message is generated via application of one or more encryption algorithms to the generated data message using at least one encryption key. In step 508, an identification value may be appended to the encrypted message by the generation module (e.g., the generation module 208) of the processing server. In step 510, the appended encrypted message may be submitted to a public ledger associated with a second computing system (e.g., the computing system 108) by the transmitting device of the processing server.

In one embodiment, the data message may be a transaction message related to an electronic transaction, and the identification value may be associated with an issuing financial institution or credential authority involved in the related electronic transaction. In some embodiments, the public ledger may be a blockchain associated with a blockchain network, and the second computing system may be a node in the associated blockchain network. In one embodiment, the identification value may be associated with a third computing system (e.g., the receiving processing server 104). In some embodiments, the processing server may not receive or possess the at least one encryption key.

Exemplary Method for Receiving a Data Message Using a Public Ledger

Figure 6:
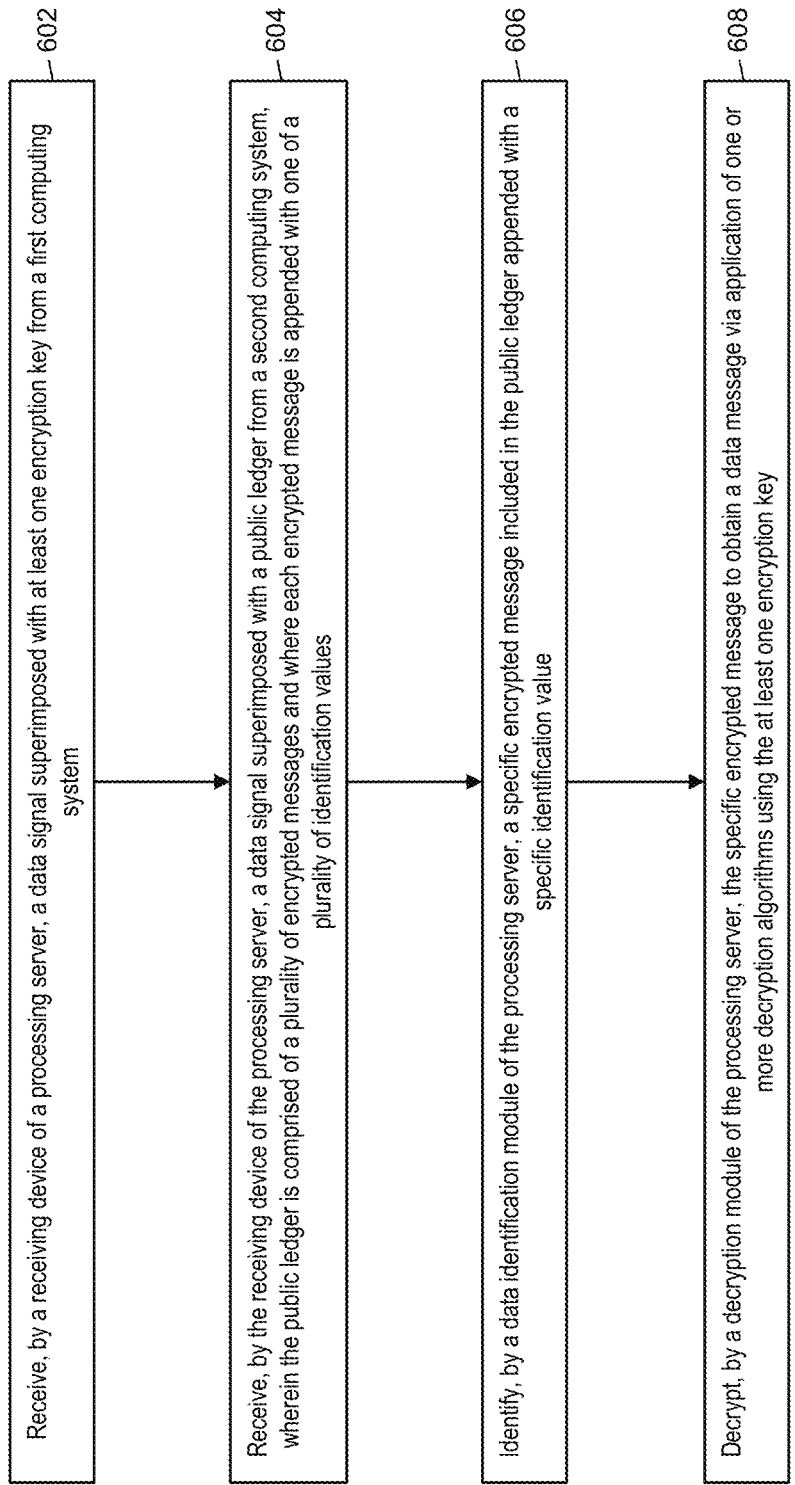
FIG. 6 is a flow chart illustrating an exemplary method for receiving a data message using a public ledger in accordance with exemplary embodiments.

FIG. 6 illustrates a method 600 for the receipt of a secured data message conveyed using a public ledger and a third party system.

In step 602, a data signal superimposed with at least one encryption key may be received by a receiving device (e.g., the receiving device 302) of a processing server (e.g., the receiving processing server 104) from a first computing system (e.g., the third party system 106). In step 604, a data signal superimposed with a public ledger may be received by the receiving device of the processing server from a second computing system (e.g., the computing system 108), wherein the public ledger is comprised of a plurality of encrypted messages and where each encrypted message is appended with one of a plurality of identification values.

In step 606, a specific encrypted message included in the public ledger that is appended with a specific identification value may be identified by a data identification module (e.g., the data identification module 308) of the processing server. In step 608, the specific encrypted message may be decrypted by a decryption module (e.g., the decryption module 316) of the processing server to obtain a data message via application of one or more decryption algorithms using the at least one encryption key.

In one embodiment, the method 600 may further include: storing, in a memory (e.g., the memory 314) of the processing server, a plurality of data pairs, wherein each data pair is a structured data set including at least an identification value and a corresponding encryption key; and executing, by a querying module (e.g., the querying module 306) of the processing server, a query on the memory to identify a specific data pair where the included encryption key corresponds to the at least one encryption key, wherein the specific identification value is the identification value included in the identified specific data pair. In some embodiments, the specific identification value may be associated with a third computing system (e.g., the sending processing server 102).

In one embodiment, the public ledger may be a blockchain associated with a blockchain network, and the second computing system may be a node in the associated blockchain network. In some embodiments, the data message may be a transaction message related to an electronic transaction, and the first computing system may be associated with an acquiring financial institution involved in the related electronic transaction.

Payment Transaction Processing System and Process

Figure 7:
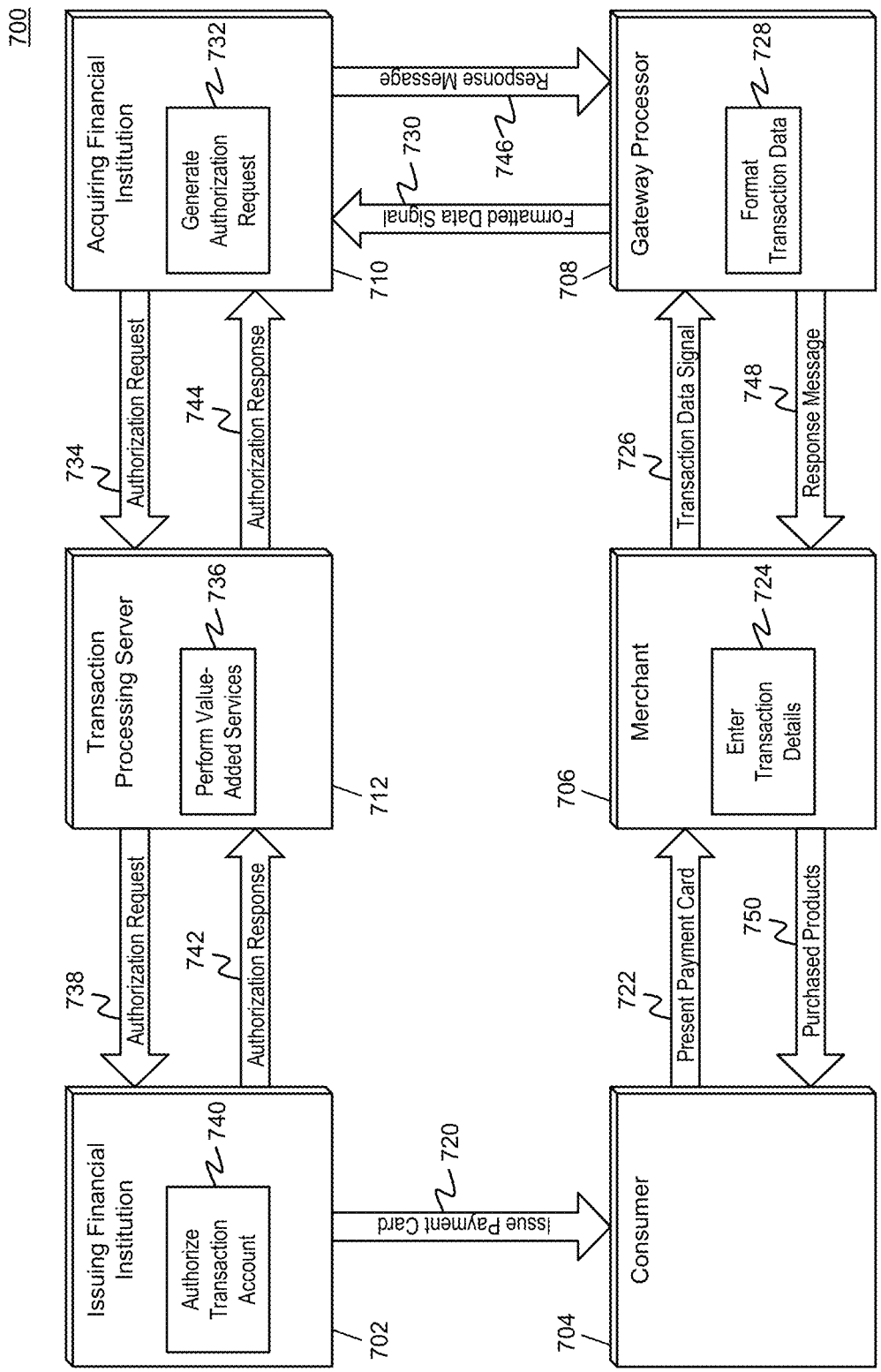
FIG. 7 is a flow diagram illustrating the processing of a payment transaction in accordance with exemplary embodiments.

FIG. 7 illustrates a transaction processing system and a process 700 for the processing of payment transactions in the system, which may include the processing of thousands, millions, or even billions of transactions during a given period (e.g., hourly, daily, weekly, etc.). The process 700 and steps included therein may be performed by one or more components of the system 100 discussed above, such as the sending processing server 102, receiving processing server 104, third party system 106, consumer 112, payment instrument 114, etc. The processing of payment transactions using the system and process 700 illustrated in FIG. 7 and discussed below may utilize the payment rails, which may be comprised of the computing devices and infrastructure utilized to perform the steps of the process 700 as specially configured and programmed by the entities discussed below, including the transaction processing server 712, which may be associated with one or more payment networks configured to processing payment transactions. It will be apparent to persons having skill in the relevant art that the process 700 may be incorporated into the processes illustrated in FIGS. 4-6, discussed above, with respect to the step or steps involved in the processing of a payment transaction. In addition, the entities discussed herein for performing the process 700 may include one or more computing devices or systems configured to perform the functions discussed below. For instance, the merchant 706 may be comprised of one or more point of sale devices, a local communication network, a computing server, and other devices configured to perform the functions discussed below.

In step 720, an issuing financial institution 702 may issue a payment card or other suitable payment instrument to a consumer 704. The issuing financial institution may be a financial institution, such as a bank, or other suitable type of entity that administers and manages payment accounts and/or payment instruments for use with payment accounts that can be used to fund payment transactions. The consumer 704 may have a transaction account with the issuing financial institution 702 for which the issued payment card is associated, such that, when used in a payment transaction, the payment transaction is funded by the associated transaction account. In some embodiments, the payment card may be issued to the consumer 704 physically. In other embodiments, the payment card may be a virtual payment card or otherwise provisioned to the consumer 704 in an electronic format.

In step 722, the consumer 704 may present the issued payment card to a merchant 706 for use in funding a payment transaction. The merchant 706 may be a business, another consumer, or any entity that may engage in a payment transaction with the consumer 704. The payment card may be presented by the consumer 704 via providing the physical card to the merchant 706, electronically transmitting (e.g., via near field communication, wireless transmission, or other suitable electronic transmission type and protocol) payment details for the payment card, or initiating transmission of payment details to the merchant 706 via a third party. The merchant 706 may receive the payment details (e.g., via the electronic transmission, via reading them from a physical payment card, etc.), which may include at least a transaction account number associated with the payment card and/or associated transaction account. In some instances, the payment details may include one or more application cryptograms, which may be used in the processing of the payment transaction.

In step 724, the merchant 706 may enter transaction details into a point of sale computing system. The transaction details may include the payment details provided by the consumer 704 associated with the payment card and additional details associated with the transaction, such as a transaction amount, time and/or date, product data, offer data, loyalty data, reward data, merchant data, consumer data, point of sale data, etc. Transaction details may be entered into the point of sale system of the merchant 706 via one or more input devices, such as an optical bar code scanner configured to scan product bar codes, a keyboard configured to receive product codes input by a user, etc. The merchant point of sale system may be a specifically configured computing device and/or special purpose computing device intended for the purpose of processing electronic financial transactions and communicating with a payment network (e.g., via the payment rails). The merchant point of sale system may be an electronic device upon which a point of sale system application is run, wherein the application causes the electronic device to receive and communicated electronic financial transaction information to a payment network. In some embodiments, the merchant 706 may be an online retailer in an e-commerce transaction. In such embodiments, the transaction details may be entered in a shopping cart or other repository for storing transaction data in an electronic transaction as will be apparent to persons having skill in the relevant art.

In step 726, the merchant 706 may electronically transmit a data signal superimposed with transaction data to a gateway processor 708. The gateway processor 708 may be an entity configured to receive transaction details from a merchant 706 for formatting and transmission to an acquiring financial institution 710. In some instances, a gateway processor 708 may be associated with a plurality of merchants 706 and a plurality of acquiring financial institutions 710. In such instances, the gateway processor 708 may receive transaction details for a plurality of different transactions involving various merchants, which may be forwarded on to appropriate acquiring financial institutions 710. By having relationships with multiple acquiring financial institutions 710 and having the requisite infrastructure to communicate with financial institutions using the payment rails, such as using application programming interfaces associated with the gateway processor 708 or financial institutions used for the submission, receipt, and retrieval of data, a gateway processor 708 may act as an intermediary for a merchant 706 to be able to conduct payment transactions via a single communication channel and format with the gateway processor 708, without having to maintain relationships with multiple acquiring financial institutions 710 and payment processors and the hardware associated thereto. Acquiring financial institutions 710 may be financial institutions, such as banks, or other entities that administers and manages payment accounts and/or payment instruments for use with payment accounts. In some instances, acquiring financial institutions 710 may manage transaction accounts for merchants 706. In some cases, a single financial institution may operate as both an issuing financial institution 702 and an acquiring financial institution 710.

The data signal transmitted from the merchant 706 to the gateway processor 708 may be superimposed with the transaction details for the payment transaction, which may be formatted based on one or more standards. In some embodiments, the standards may be set forth by the gateway processor 708, which may use a unique, proprietary format for the transmission of transaction data to/from the gateway processor 708. In other embodiments, a public standard may be used, such as the International Organization for Standardization's ISO 8783 standard. The standard may indicate the types of data that may be included, the formatting of the data, how the data is to be stored and transmitted, and other criteria for the transmission of the transaction data to the gateway processor 708.

In step 728, the gateway processor 708 may parse the transaction data signal to obtain the transaction data superimposed thereon and may format the transaction data as necessary. The formatting of the transaction data may be performed by the gateway processor 708 based on the proprietary standards of the gateway processor 708 or an acquiring financial institution 710 associated with the payment transaction. The proprietary standards may specify the type of data included in the transaction data and the format for storage and transmission of the data. The acquiring financial institution 710 may be identified by the gateway processor 708 using the transaction data, such as by parsing the transaction data (e.g., deconstructing into data elements) to obtain an account identifier included therein associated with the acquiring financial institution 710. In some instances, the gateway processor 708 may then format the transaction data based on the identified acquiring financial institution 710, such as to comply with standards of formatting specified by the acquiring financial institution 710. In some embodiments, the identified acquiring financial institution 710 may be associated with the merchant 706 involved in the payment transaction, and, in some cases, may manage a transaction account associated with the merchant 706.

In step 730, the gateway processor 708 may electronically transmit a data signal superimposed with the formatted transaction data to the identified acquiring financial institution 710. The acquiring financial institution 710 may receive the data signal and parse the signal to obtain the formatted transaction data superimposed thereon. In step 732, the acquiring financial institution may generate an authorization request for the payment transaction based on the formatted transaction data. The authorization request may be a specially formatted transaction message that is formatted pursuant to one or more standards, such as the ISO 8783 standard and standards set forth by a payment processor used to process the payment transaction, such as a payment network. The authorization request may be a transaction message that includes a message type indicator indicative of an authorization request, which may indicate that the merchant 706 involved in the payment transaction is requesting payment or a promise of payment from the issuing financial institution 702 for the transaction. The authorization request may include a plurality of data elements, each data element being configured to store data as set forth in the associated standards, such as for storing an account number, application cryptogram, transaction amount, issuing financial institution 702 information, etc.

In step 734, the acquiring financial institution 710 may electronically transmit the authorization request to a transaction processing server 712 for processing. The transaction processing server 712 may be comprised of one or more computing devices as part of a payment network configured to process payment transactions. In some embodiments, the authorization request may be transmitted by a transaction processor at the acquiring financial institution 710 or other entity associated with the acquiring financial institution. The transaction processor may be one or more computing devices that include a plurality of communication channels for communication with the transaction processing server 712 for the transmission of transaction messages and other data to and from the transaction processing server 712. In some embodiments, the payment network associated with the transaction processing server 712 may own or operate each transaction processor such that the payment network may maintain control over the communication of transaction messages to and from the transaction processing server 712 for network and informational security.

In step 736, the transaction processing server 712 may perform value-added services for the payment transaction. Value-added services may be services specified by the issuing financial institution 702 that may provide additional value to the issuing financial institution 702 or the consumer 704 in the processing of payment transactions. Value-added services may include, for example, fraud scoring, transaction or account controls, account number mapping, offer redemption, loyalty processing, etc. For instance, when the transaction processing server 712 receives the transaction, a fraud score for the transaction may be calculated based on the data included therein and one or more fraud scoring algorithms and/or engines. In some instances, the transaction processing server 712 may first identify the issuing financial institution 702 associated with the transaction, and then identify any services indicated by the issuing financial institution 702 to be performed. The issuing financial institution 702 may be identified, for example, by data included in a specific data element included in the authorization request, such as an issuer identification number. In another example, the issuing financial institution 702 may be identified by the primary account number stored in the authorization request, such as by using a portion of the primary account number (e.g., a bank identification number) for identification.

In step 738, the transaction processing server 712 may electronically transmit the authorization request to the issuing financial institution 702. In some instances, the authorization request may be modified, or additional data included in or transmitted accompanying the authorization request as a result of the performance of value-added services by the transaction processing server 712. In some embodiments, the authorization request may be transmitted to a transaction processor (e.g., owned or operated by the transaction processing server 712) situated at the issuing financial institution 702 or an entity associated thereof, which may forward the authorization request to the issuing financial institution 702.

In step 740, the issuing financial institution 702 may authorize the transaction account for payment of the payment transaction. The authorization may be based on an available credit amount for the transaction account and the transaction amount for the payment transaction, fraud scores provided by the transaction processing server 712, and other considerations that will be apparent to persons having skill in the relevant art. The issuing financial institution 702 may modify the authorization request to include a response code indicating approval (e.g., or denial if the transaction is to be denied) of the payment transaction. The issuing financial institution 702 may also modify a message type indicator for the transaction message to indicate that the transaction message is changed to be an authorization response. In step 742, the issuing financial institution 702 may transmit (e.g., via a transaction processor) the authorization response to the transaction processing server 712.

In step 744, the transaction processing server 712 may forward the authorization response to the acquiring financial institution 710 (e.g., via a transaction processor). In step 746, the acquiring financial institution may generate a response message indicating approval or denial of the payment transaction as indicated in the response code of the authorization response, and may transmit the response message to the gateway processor 708 using the standards and protocols set forth by the gateway processor 708. In step 748, the gateway processor 708 may forward the response message to the merchant 706 using the appropriate standards and protocols. In step 750, assuming the transaction was approved, the merchant 706 may then provide the products purchased by the consumer 704 as part of the payment transaction to the consumer 704.

In some embodiments, once the process 700 has completed, payment from the issuing financial institution 702 to the acquiring financial institution 710 may be performed. In some instances, the payment may be made immediately or within one business day. In other instances, the payment may be made after a period of time, and in response to the submission of a clearing request from the acquiring financial institution 710 to the issuing financial institution 702 via the transaction processing server 702. In such instances, clearing requests for multiple payment transactions may be aggregated into a single clearing request, which may be used by the transaction processing server 712 to identify overall payments to be made by whom and to whom for settlement of payment transactions.

In some instances, the system may also be configured to perform the processing of payment transactions in instances where communication paths may be unavailable. For example, if the issuing financial institution is unavailable to perform authorization of the transaction account (e.g., in step 740), the transaction processing server 712 may be configured to perform authorization of transactions on behalf of the issuing financial institution 702. Such actions may be referred to as "stand-in processing," where the transaction processing server "stands in" as the issuing financial institution 702. In such instances, the transaction processing server 712 may utilize rules set forth by the issuing financial institution 702 to determine approval or denial of the payment transaction, and may modify the transaction message accordingly prior to forwarding to the acquiring financial institution 710 in step 744. The transaction processing server 712 may retain data associated with transactions for which the transaction processing server 712 stands in, and may transmit the retained data to the issuing financial institution 702 once communication is reestablished. The issuing financial institution 702 may then process transaction accounts accordingly to accommodate for the time of lost communication.

In another example, if the transaction processing server 712 is unavailable for submission of the authorization request by the acquiring financial institution 710, then the transaction processor at the acquiring financial institution 710 may be configured to perform the processing of the transaction processing server 712 and the issuing financial institution 702. The transaction processor may include rules and data suitable for use in making a determination of approval or denial of the payment transaction based on the data included therein. For instance, the issuing financial institution 702 and/or transaction processing server 712 may set limits on transaction type, transaction amount, etc. that may be stored in the transaction processor and used to determine approval or denial of a payment transaction based thereon. In such instances, the acquiring financial institution 710 may receive an authorization response for the payment transaction even if the transaction processing server 712 is unavailable, ensuring that transactions are processed and no downtime is experienced even in instances where communication is unavailable. In such cases, the transaction processor may store transaction details for the payment transactions, which may be transmitted to the transaction processing server 712 (e.g., and from there to the associated issuing financial institutions 702) once communication is reestablished.

In some embodiments, transaction processors may be configured to include a plurality of different communication channels, which may utilize multiple communication cards and/or devices, to communicate with the transaction processing server 712 for the sending and receiving of transaction messages. For example, a transaction processor may be comprised of multiple computing devices, each having multiple communication ports that are connected to the transaction processing server 712. In such embodiments, the transaction processor may cycle through the communication channels when transmitting transaction messages to the transaction processing server 712, to alleviate network congestion and ensure faster, smoother communications. Furthermore, in instances where a communication channel may be interrupted or otherwise unavailable, alternative communication channels may thereby be available, to further increase the uptime of the network.

In some embodiments, transaction processors may be configured to communicate directly with other transaction processors. For example, a transaction processor at an acquiring financial institution 710 may identify that an authorization request involves an issuing financial institution 702 (e.g., via the bank identification number included in the transaction message) for which no value-added services are required. The transaction processor at the acquiring financial institution 710 may then transmit the authorization request directly to the transaction processor at the issuing financial institution 702 (e.g., without the authorization request passing through the transaction processing server 712), where the issuing financial institution 702 may process the transaction accordingly.

The methods discussed above for the processing of payment transactions that utilize multiple methods of communication using multiple communication channels, and includes fail safes to provide for the processing of payment transactions at multiple points in the process and at multiple locations in the system, as well as redundancies to ensure that communications arrive at their destination successfully even in instances of interruptions, may provide for a robust system that ensures that payment transactions are always processed successfully with minimal error and interruption. This advanced network and its infrastructure and topology may be commonly referred to as "payment rails," where transaction data may be submitted to the payment rails from merchants at millions of different points of sale, to be routed through the infrastructure to the appropriate transaction processing servers 712 for processing. The payment rails may be such that a general purpose computing device may be unable to properly format or submit communications to the rails, without specialized programming and/or configuration. Through the specialized purposing of a computing device, the computing device may be configured to submit transaction data to the appropriate entity (e.g., a gateway processor 708, acquiring financial institution 710, etc.) for processing using this advanced network, and to quickly and efficiently receive a response regarding the ability for a consumer 704 to fund the payment transaction.

Computer System Architecture

Figure 8:
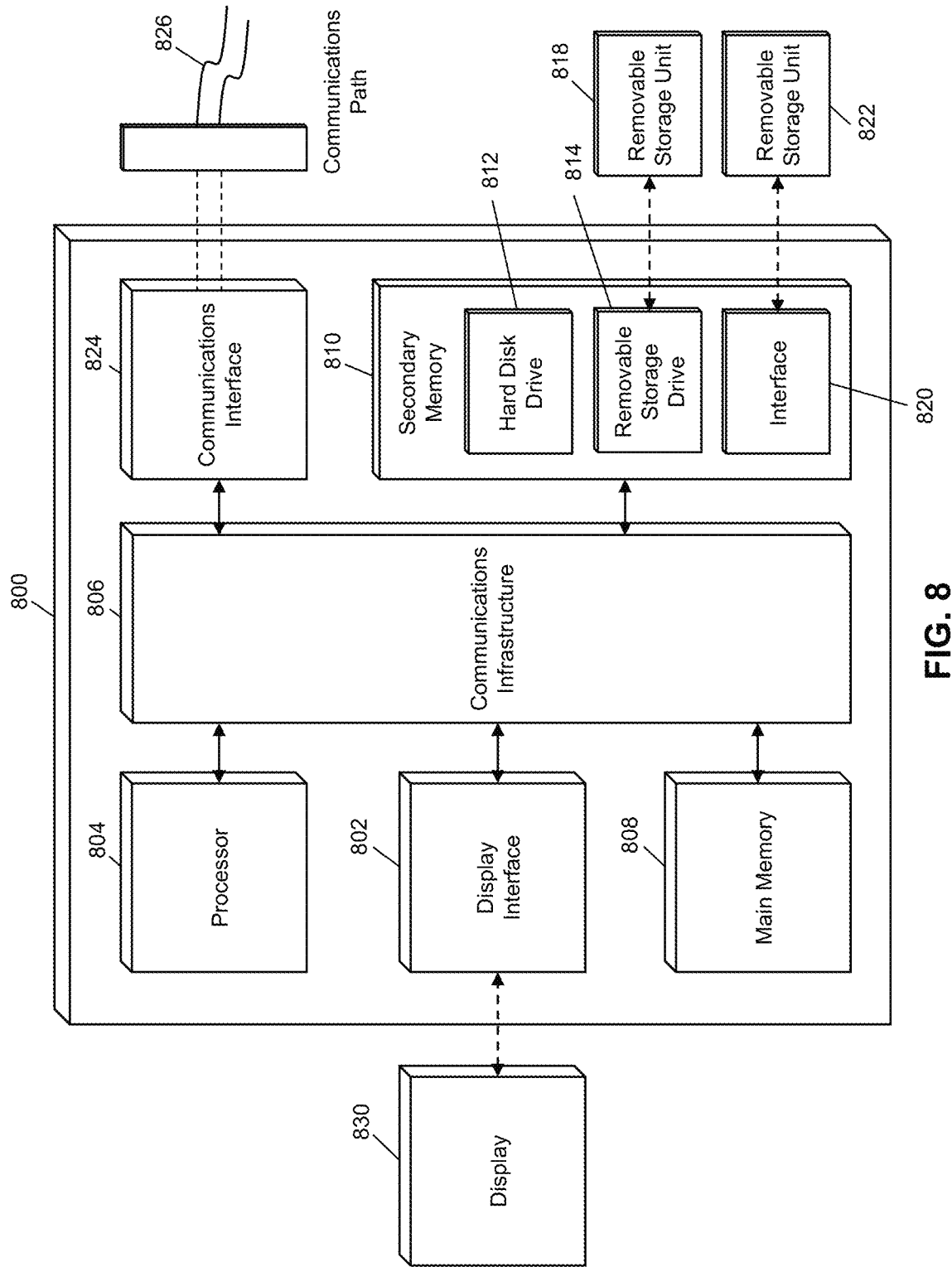
FIG. 8 is a block diagram illustrating a computer system architecture in accordance with exemplary embodiments.

FIG. 8 illustrates a computer system 800 in which embodiments of the present disclosure, or portions thereof, may be implemented as computer-readable code. For example, the sending processing server 102 and receiving processing server 104 of FIG. 1 may be implemented in the computer system 800 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 4-7.

If programmable logic is used, such logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 818, a removable storage unit 822, and a hard disk installed in hard disk drive 812.

Various embodiments of the present disclosure are described in terms of this example computer system 800. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 804 may be a special purpose or a general purpose processor device specifically configured to perform the functions discussed herein. The processor device 804 may be connected to a communications infrastructure 806, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 800 may also include a main memory 808 (e.g., random access memory, read-only memory, etc.), and may also include a secondary memory 810. The secondary memory 810 may include the hard disk drive 812 and a removable storage drive 814, such as a floppy disk drive, a magnetic tape drive, an optical disk drive, a flash memory, etc.

The removable storage drive 814 may read from and/or write to the removable storage unit 818 in a well-known manner. The removable storage unit 818 may include a removable storage media that may be read by and written to by the removable storage drive 814. For example, if the removable storage drive 814 is a floppy disk drive or universal serial bus port, the removable storage unit 818 may be a floppy disk or portable flash drive, respectively. In one embodiment, the removable storage unit 818 may be non-transitory computer readable recording media.

In some embodiments, the secondary memory 810 may include alternative means for allowing computer programs or other instructions to be loaded into the computer system 800, for example, the removable storage unit 822 and an interface 820. Examples of such means may include a program cartridge and cartridge interface (e.g., as found in video game systems), a removable memory chip (e.g., EEPROM, PROM, etc.) and associated socket, and other removable storage units 822 and interfaces 820 as will be apparent to persons having skill in the relevant art.

Data stored in the computer system 800 (e.g., in the main memory 808 and/or the secondary memory 810) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 800 may also include a communications interface 824. The communications interface 824 may be configured to allow software and data to be transferred between the computer system 800 and external devices. Exemplary communications interfaces 824 may include a modem, a network interface (e.g., an Ethernet card), a communications port, a PCMCIA slot and card, etc. Software and data transferred via the communications interface 824 may be in the form of signals, which may be electronic, electromagnetic, optical, or other signals as will be apparent to persons having skill in the relevant art. The signals may travel via a communications path 826, which may be configured to carry the signals and may be implemented using wire, cable, fiber optics, a phone line, a cellular phone link, a radio frequency link, etc.

The computer system 800 may further include a display interface 802. The display interface 802 may be configured to allow data to be transferred between the computer system 800 and external display 830. Exemplary display interfaces 802 may include high-definition multimedia interface (HDMI), digital visual interface (DVI), video graphics array (VGA), etc. The display 830 may be any suitable type of display for displaying data transmitted via the display interface 802 of the computer system 800, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 808 and secondary memory 810, which may be memory semiconductors (e.g., DRAMs, etc.). These computer program products may be means for providing software to the computer system 800. Computer programs (e.g., computer control logic) may be stored in the main memory 808 and/or the secondary memory 810. Computer programs may also be received via the communications interface 824. Such computer programs, when executed, may enable computer system 800 to implement the present methods as discussed herein. In particular, the computer programs, when executed, may enable processor device 804 to implement the methods illustrated by FIGS. 4-7, as discussed herein. Accordingly, such computer programs may represent controllers of the computer system 800. Where the present disclosure is implemented using software, the software may be stored in a computer program product and loaded into the computer system 800 using the removable storage drive 814, interface 820, and hard disk drive 812, or communications interface 824.

The processor device 804 may comprise one or more modules or engines configured to perform the functions of the computer system 800. Each of the modules or engines may be implemented using hardware and, in some instances, may also utilize software, such as corresponding to program code and/or programs stored in the main memory 808 or secondary memory 810. In such instances, program code may be compiled by the processor device 804 (e.g., by a compiling module or engine) prior to execution by the hardware of the computer system 800. For example, the program code may be source code written in a programming language that is translated into a lower level language, such as assembly language or machine code, for execution by the processor device 804 and/or any additional hardware components of the computer system 800. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 800 to perform the functions disclosed herein. It will be apparent to persons having skill in the relevant art that such processes result in the computer system 800 being a specially configured computer system 800 uniquely programmed to perform the functions discussed above.

Techniques consistent with the present disclosure provide, among other features, systems and methods for determining real-time authorization of a credit check. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for securely conveying a transaction message, comprising:
    applying, by a first computing system, one or more encryption algorithms to a data message using at least one encryption key to generate an encrypted message;
    transmitting, by the first computing system, the at least one encryption key to a third computing system different from a processing server, wherein the third computing system acts as a node in a blockchain network;
    receiving, by a receiving device of the processing server from the first computing system, a data signal superimposed with the encrypted message, wherein the processing server does not receive the at least one encryption key;
    appending, by the processing server, an identification value to the encrypted message;
    submitting, by the transmitting device of the processing server, the appended encrypted message to a second computing system, wherein the second computing system is a node in the blockchain network;
    adding, by the second computing system acting as a node in the blockchain network, the encrypted message as a new transaction in a new block of one or more transactions to be added to a blockchain associated with the blockchain network, wherein the appended identification value is a destination address associated with the third computing system acting as a node in the blockchain network for the new transaction;
    retrieving, by the third computing system from the blockchain and based on the appended identification value, the encrypted message; and
    decrypting, by the third computing system, the encrypted message with the at least one encryption key transmitted by the first computing system.

2. The method of claim 1, wherein the identification value is associated with an issuing financial institution or credential authority involved in the related electronic transaction.

3. The method of claim 1, wherein the processing server does not possess the at least one encryption key.

4. The method of claim 1, further comprising:
    receiving, by the receiving device of the processing server, a data signal superimposed with the at least one encryption key from the first computing system;
    receiving, by the receiving device of the processing server, a data signal superimposed with the blockchain from the second computing system, wherein the blockchain includes a plurality of encrypted messages and where each encrypted message is appended with one of a plurality of identification values;
    identifying, by a data identification module of the processing server, a specific encrypted message included in the blockchain appended with a specific identification value; and
    decrypting, by a decryption module of the processing server, the specific encrypted message to obtain a data message via application of one or more decryption algorithms using the at least one encryption key,
    wherein the specific identification value is associated with the third computing system.

5. The method of claim 4, further comprising:
    storing, in a memory of the processing server, a plurality of data pairs, wherein each data pair is a structured data set including at least an identification value and a corresponding encryption key; and
    executing, by a querying module of the processing server, a query on the memory to identify a specific data pair where the included encryption key corresponds to the at least one encryption key, wherein
    the specific identification value is the identification value included in the identified specific data pair.

6. The method of claim 4, wherein
    the data message is a transaction message related to an electronic transaction, and
    the first computing system is associated with an acquiring financial institution involved in the related electronic transaction.

7. A system for securely conveying a transaction message, comprising:
    a first computing system configured to apply one or more encryption algorithms to a data message using at least one encryption key to generate an encrypted message;
    the first computing system configured to transmit the at least one encryption key to a third computing system different from a processing server, wherein the third computing system acts as a node in a blockchain network;
    a receiving device of the processing server configured to receive from the first computing system a data signal superimposed with the encrypted message, wherein the processing server does not receive the at least one encryption key, wherein
    the processing server is further configured to append an identification value to the encrypted message, and
    the transmitting device of the processing server is further configured to submit the appended encrypted message to a second computing system, wherein the second computing system is a node in the blockchain network;

the second computing system acting as a node in the blockchain network configured to add the encrypted message as a new transaction in a new block of one or more transactions to be added to a blockchain associated with the blockchain network, wherein the appended identification value is a destination address associated with the third computing system acting as a node in the blockchain network for the new transaction;

the third computing system configured to retrieve from the blockchain and based on the appended identification value, the encrypted message; and the third computing system configured to decrypt the encrypted message with the at least one encryption key transmitted by the first computing system.

8. The system of claim 7, wherein the identification value is associated with an issuing financial institution or credential authority involved in the related electronic transaction.

9. The system of claim 7, wherein the processing server does not possess the at least one encryption key.

10. The system of claim 7, further comprising:
the receiving device of the processing server configured to receive a data signal superimposed with the at least one encryption key from the first computing system, and receive a data signal superimposed with the blockchain from the second computing system, wherein the blockchain is comprised of a plurality of encrypted messages and where each encrypted message is appended with one of a plurality of identification values;

a data identification module of the processing server configured to identify a specific encrypted message included in the ledger appended with a specific identification value; and a decryption module of the processing server configured to decrypt the specific encrypted message to obtain a data message via application of one or more decryption algorithms using the at least one encryption key, wherein the specific identification value is associated with the third computing system.

11. The system of claim 10, further comprising:
a memory of the processing server configured to store a plurality of data pairs, wherein each data pair is a structured data set including at least an identification value and a corresponding encryption key; and a querying module of the processing server configured to execute a query on the memory to identify a specific data pair where the included encryption key corresponds to the at least one encryption key, wherein the specific identification value is the identification value included in the identified specific data pair.

12. The system of claim 10, wherein
the data message is a transaction message related to an electronic transaction, and the first computing system is associated with an acquiring financial institution involved in the related electronic transaction.

\* \* \* \* \*